Feb. 14, 1939.                G. I. DANLY                2,147,013
                                BOLT
                         Filed May 31, 1938
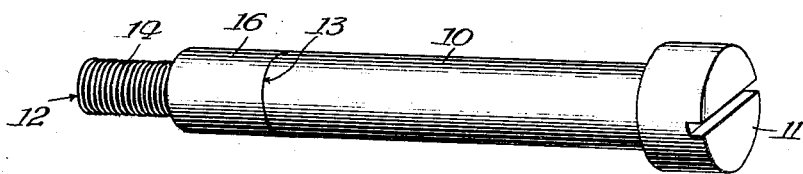
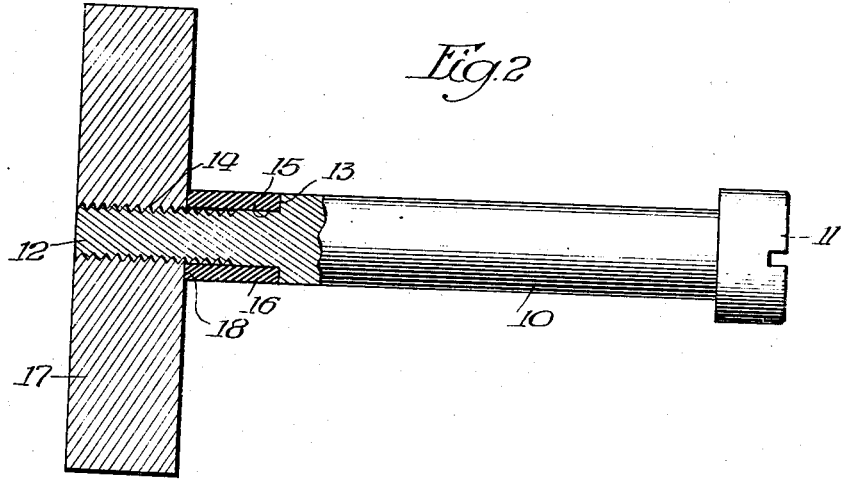
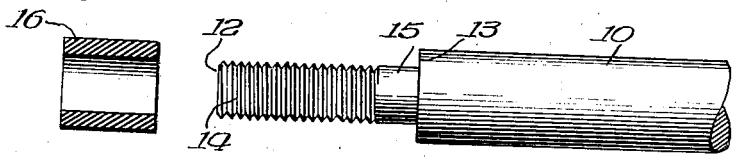
Inventor
George I. Danly
By [signature]
Atty Patented Feb. 14, 1939

2,147,013

UNITED STATES PATENT OFFICE 2,147,013

BOLT

George I. Danly, Elmhurst, Ill., assignor to Danly Machine Specialties, Inc., Chicago, Ill., a corporation of Illinois Application May 31, 1938, Serial No. 210,883

8 Claims. (Cl. 85—1)

In machine work, in dies, with stripper plates for dies, and for many other purposes the bolts which have been employed to fasten or connect the parts together have been provided with a reduced threaded end to form a shoulder in proximity to the inner end of the threaded portion, the shoulder when the bolt is in use abutting a plate or anchor element.

In certain types of mechanisms with which these bolts are employed there is wear on the parts which necessitates an adjustment of the bolt to tighten the parts or take up the wear.

In order, in some instances, to obtain such tightening or adjustment of the bolts, the shoulder on the shank of the bolt which is adjacent the reduced threaded portion has generally been cut away either by filing or otherwise, which results in the production of an extended reduced portion having no threads. This weakens the bolt and in many instances the extent of the engagement of the threaded portion with the co-operating member will be reduced, which is objectionable.

It is one of the objects of the present invention to overcome these difficulties and objections an to provide an improved bolt of this character having means whereby such adjustment may be made without reducing the extent of the active portion of the threaded part of the bolt that engages the cooperating member or element.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a perspective view of a bolt of this character constructed in accordance with the principles of this invention.

Figure 2 is a view partly in section, partly broken away and partly in elevation showing the manner of using the bolt.

Figure 3 is a detail sectional view of the extension sleeve.

Figure 4 is a detail elevation of a portion of the bolt with the extension sleeve removed.

Referring more particularly to the drawing, the bolt consists essentially of a shank portion 10 provided with a head 11 and a reduced extremity 12. This reduced portion may be of any desired diameter, less than the diameter of the shank and forms a circumferential shoulder 13 disposed at any desired distance from the free extremity of the reduced portion 12. This reduced portion is provided with screw threads 14 which terminate a substantial distance from the shoulder 13 to provide an unthreaded portion 15, which may be of any desired extent.

The numeral 16 designates a collar which is sleeved upon the reduced portion 12 so that one end will abut the circumferential shoulder 13 and extend over the unthreaded portion 15 on the reduced part of the bolt.

The sleeve or collar 16 may be of any desired length but is of such a length that it will terminate for a considerable distance short of the free extremity of the reduced portion 12. The sleeve is preferably of an external diameter which is substantially equal to the external diameter of the adjacent portion of the shank of the bolt and may be constructed of any desired or suitable material.

In use the sleeve or collar 16 is placed upon the end of the bolt by slipping the same over the reduced portion 12 until the end of the sleeve abuts the shoulder 13, and the sleeve is held permanently in position in any suitable manner so that it will become an extension or continuation of the shank of the bolt and will extend for any desired distance over the threaded reduced portion 12 of the bolt, the free or outer end of the sleeve constituting a shoulder or abutment for engagement with the part to which the bolt is secured. In use the reduced portion 12 is threaded into a bolt, member or anchor 17 until the outer extremity 18 of the sleeve or collar 16 abuts the member or element 17.

When it becomes necessary to adjust the parts by adjusting the bolt 10 with respect to the member or element 17, the bolt can be entirely removed or only partially removed, if desired, and the length of the sleeve or collar 13 is reduced by cutting away or filing off the free end 18 of the collar, and, as this sleeve or collar 16 extends over a portion of the threads on the reduced part 12 it will be manifest that an additional portion of the threads will be exposed, with the result that after the bolt has been adjusted with respect to the member 17, subsequent to the reducing of the length of the sleeve 16 the extent or area of the engagement of the threads of the reduced portion 12 with the member or element 17 will not be reduced.

This is also true even though the bolt 10 is adjusted sufficiently that the extremity of the reduced portion 12 of the bolt should project entirely through and beyond the surface of the element 17.

The sleeve or collar 16 being permanently secured to the bolt will protect that portion of the threads of the reduced part 12 which is not actively engaged with a co-operating member.

Obviously the sleeve or collar 16 may be of any desired length and any desired amount may be cut off of the free end thereof.

The external diameter of the sleeve or collar being substantially equal to the external diameter of the adjacent portion of the shank 10 of the bolt will prevent the formation of any shoulders or projecting portions between the contacting faces of the shoulder 13 with the adjacent end of the sleeve or collar 16. The sleeve may be constructed of any suitable material and any suitable fastening means may be employed so as to hold the sleeve permanently in position and for preventing the same from rotating or moving with respect to the shank 10 of the bolt.

While the prefered form of the invention has been herein shown and described, it is to be understood that various changes may be made in the details of construction and in the combination and arrangement of the several parts, within the scope of the claims without departing from the spirit of this invention.

What is claimed as new is:—

1. As an article of manufacture, a bolt embodying a shank provided with a threaded reduced end to provide a circumferential shoulder adjacent such threaded portion, and a sleeve encompassing the reduced portion and extending over a portion only of said threaded end adjacent said shoulder.

2. As an article of manufacture, a bolt embodying a shank provided with a reduced threaded end of substantially uniform diameter to provide a circumferential shoulder, and a sleeve encompassing a portion of said threaded end adjacent and abutting said shoulder, the said sleeve being of a length to terminate considerably short of the free end of the said reduced end.

3. A bolt of the character described embodying a shank provided with a reduced threaded end of substantially uniform diameter to provide a circumferential shoulder, and a sleeve encompassing a portion of said threaded end adjacent and abutting said shoulder, the said sleeve being of a length to terminate considerably short of the free end of the said reduced end, and permanently secured to the bolt.

4. A bolt of the character described embodying a shank provided with a reduced threaded end of substantially uniform diameter to provide a circumferential shoulder, and a sleeve encompassing a portion of said threaded end adjacent and abutting said shoulder, the said sleeve being of a length to terminate considerably short of the free end of the said reduced end, and permanently secured to the bolt, the external diameter of the sleeve being substantially equal to the external diameter of the adjacent portion of the shank of the bolt.

5. A bolt embodying a shank one end of which is reduced for a substantial distance to provide a circumferential shoulder, threads on the reduced portion, and a sleeve encompassing said reduced portion and a portion only of the threads, the sleeve being permanently secured to the bolt and of a uniform external diameter substantially equal to the external diameter of the adjacent part of the bolt shank, said sleeve terminating considerably short of the free end of the reduced threaded portion of the bolt, one end of the sleeve abutting said shoulder and the outer end of the sleeve providing an abutting shoulder.

6. A bolt of the character described embodying a shank, one end of the shank for a substantial distance being reduced to provide a circumferential shoulder, threads on the said reduced end, a portion of the reduced portion between the threads and said shoulder being unthreaded, and a sleeve encompassing said reduced end and extending over and permanently secured to said unthreaded portion, and also extending over a portion only of said threads and for a substantial distance.

7. A bolt of the character described embodying a shank, one end of the shank for a substantial distance being reduced to provide a circumferential shoulder, threads on the said reduced end, a portion of the reduced portion between the threads and said shoulder being unthreaded, and a sleeve encompassing said reduced end and extending over and permanently secured to said unthreaded portion, and also extending over a portion only of said threads and for a substantial distance, the external diameter of the sleeve being substantially equal to the external diameter of the adjacent part of the bolt shank.

8. A bolt of the character described embodying a shank, one end of the shank for a substantial distance being reduced to provide a circumferential shoulder, threads on the said reduced end, a portion of the reduced portion between the threads and said shoulder being unthreaded, and a sleeve encompassing said reduced end and extending over and permanently secured to said unthreaded portion, and also extending over a portion only of said threads and for a substantial distance, and terminating a substantial distance from the free end of said reduced portion.

GEORGE I. DANLY.